(12) United States Patent
Vadalamani et al.

(10) Patent No.: US 12,314,169 B2
(45) Date of Patent: May 27, 2025

(54) METHOD AND SYSTEM FOR HANDLING HOST COMMANDS OVERLAPPING WITH DEFERRED UNMAP ADDRESS RANGES IN STORAGE DEVICES

(71) Applicant: WESTERN DIGITAL TECHNOLOGIES, INC., San Jose, CA (US)

(72) Inventors: Naga Shankar Vadalamani, Bangalore (IN); Nagi Reddy Chodem, Bangalore (IN); Ramdas Jayant Singathiya, Bangalore (IN)

(73) Assignee: SANDISK TECHNOLOGIES INC, Milpitas, CA (US)

( * ) Notice: Subject to any disclaimer, the term of this patent is extended or adjusted under 35 U.S.C. 154(b) by 0 days.

(21) Appl. No.: 18/372,759

(22) Filed: Sep. 26, 2023

(65) Prior Publication Data

US 2025/0103481 A1    Mar. 27, 2025

(51) Int. Cl.
*G06F 12/02*    (2006.01)
(52) U.S. Cl.
CPC .. *G06F 12/0246* (2013.01); *G06F 2212/7201* (2013.01)
(58) Field of Classification Search
CPC .................. G06F 12/0246; G06F 2212/7201
See application file for complete search history.

(56) References Cited

U.S. PATENT DOCUMENTS

| | | | |
|---|---|---|---|
| 9,032,138 B2 | 5/2015 | Choi | |
| 10,909,030 B2 | 2/2021 | Desai | |
| 10,990,287 B2 | 4/2021 | Cho | |
| 11,397,672 B2 | 7/2022 | Ju | |
| 2018/0203637 A1* | 7/2018 | Furuya | ................ G06F 3/0641 |

FOREIGN PATENT DOCUMENTS

WO    2022040914 A1    3/2022

* cited by examiner

*Primary Examiner* — Chie Yew
(74) *Attorney, Agent, or Firm* — Arlene Neal; Neal Blibo LLC (57) ABSTRACT

A storage device processes deferred unmap operations while maintaining instructions in a write command. A controller in a storage device receives an unmap command and a write command from a host, determines that a logical page in the write command overlaps with a range in the unmap command with deferred unmap operations, and processes the write command. In processing the write command, an L2P translation manager sets a collision bit for the logical page and updates a L2P table. When processing the deferred unmap operations, the controller selects the range and if, based on collision bits in the range the controller determines that there is no overlap between the write command and the range, the controller performs the deferred unmap operations for the range. If the controller determines that there is an overlap, the controller processes the deferred unmap operations to not override the write command.

20 Claims, 9 Drawing Sheets

METHOD AND SYSTEM FOR HANDLING HOST COMMANDS OVERLAPPING WITH DEFERRED UNMAP ADDRESS RANGES IN STORAGE DEVICES

BACKGROUND

A host may transmit a command to read data from and/or write data to, for example, a flash memory device coupled to a storage device. A controller on the storage device may interact with the host. When the host sends a read/write command to the storage device, the host may address the data in the command using logical block addresses. The storage device may store data in blocks on the memory device wherein the logical block addresses sent from the host may be mapped one-to-one to physical addresses on the memory device. The one-to-one logical block address to physical address mappings may be stored in a logical-to-physical (L2P) table.

When the host no longer needs a range of data, the host may issue an unmap command to the storage device. To process the unmap command, the storage device may process steps to, for example, fetch the ranges to be unmapped from the host memory, update the L2P table, log L2P table updates, and update mapping data structures in a flash translation layer. When the storage device fetches the ranges to be unmapped, the storage device may send a completion notification for the unmap command to the host. The storage device may defer other steps in the unmap process including updating the L2P table, logging L2P table updates, and updating mapping data structures for the fetched ranges (a process referred to herein as a deferred background unmap process).

The host may issue a write command after receiving the completion notification, wherein logical address(es) in the write command may overlap with logical address(es) in a deferred unmap range (i.e., a range for which the controller has sent the completion notification but has not completed the deferred background unmap process). If the controller executes the host write command before completing the deferred background unmap process, the host data may be lost when the deferred background unmap process is completed. To prevent the loss of the host data, the controller may suspend the host write command until the deferred background unmap process is completed. This may add latency to the host write command, which may reach up to half a second depending on the queue depth of the storage device.

SUMMARY

In some implementations, a storage device processes a host write command including a logical page in a range with deferred unmap operations that are yet to be completed. The storage device may also process an unmap command after the write command while maintaining the instructions in the write command. The storage device includes a controller to receive an unmap command and a write command from a host, determine that the logical page in the write command overlaps with a range in the unmap command with deferred unmap operations, notate the overlap, and process the write command. The storage device also includes a logical to physical (L2P) translation manager to receive a conditional update request for the logical page in the write command from the controller. In processing the write command, the L2P translation manager sets a collision bit for the logical page, updates a L2P table, and completes the conditional update request. When processing the deferred unmap operations, the controller selects the range and if, based on collision bits in the range the controller determines that there is no overlap between the write command and the range, the controller performs the deferred unmap operations for the range. If the controller determines that there is an overlap, the controller processes the deferred unmap operations to not override the write command.

In some implementations, a method is provided for processing deferred unmap operations and a host write command in a storage device. The host write command may be processed after the deferred unmap operations and the host write command includes a logical page in a range with deferred unmap operations that are yet to be completed. The method includes receiving, by a controller, an unmap command and a write command from a host, determining that the write command overlaps with a range in the unmap command with deferred unmap operations, setting a flag and a collision bit for the logical page in the write command, and processing the write command. The method also includes when processing the deferred unmap operations, selecting, by the controller, the range, determining when there is no overlap between the write command and the range based on collision bits in the range, and performing the deferred unmap operations for the range. The method further includes when processing the deferred unmap operations, selecting, by the controller, the range, determining when there is an overlap between the write command and the range based on the collision bit in the range, and processing the deferred unmap operations to not override the write command.

In some implementations, a method for processing deferred unmap operations in a storage device is provided. The method includes selecting a range including deferred unmap operations. The method also includes checking collision bits in the range, determining when there is no overlap between a write command and the range, and performing the deferred unmap operations for the range. The method further includes checking the collision bits in the range, determining when there is an overlap between the write command and the range, and processing the deferred unmap operations such that the deferred unmap operations do not override the write command.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
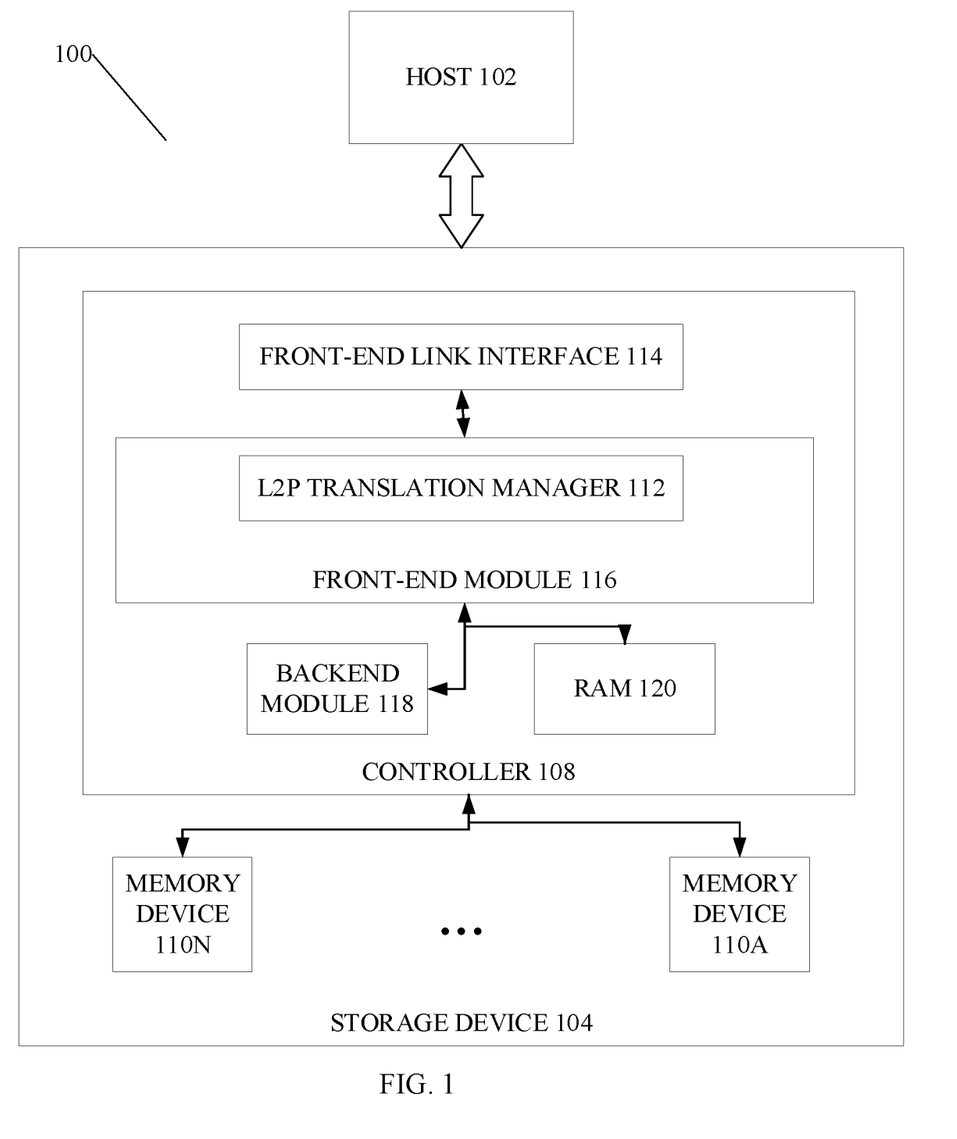
FIG. 1 is a schematic block diagram of an example system in accordance with some implementations.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108 including a logical-to-physical (L2P) translation manager 112, a front-end link interface 114, a front-end module 116, a back-end module 118, and one or more internal buffers referred to herein as random-access memory (RAM or SRAM) 120. Storage device 104 may also include one or more memory devices 110a-110n (referred to herein as memory device(s) 110. Storage device 104 may be, for example, a solid-state drive (SSD), and the like. Memory device 110 may be flash based, including, for example, NAND flash memory. Memory device 110 may be included in storage device 104 or may be otherwise communicatively coupled to storage device 104.

Controller 108 may execute background operations to manage resources on memory device 110. For example, controller 108 may monitor memory device 110 and may execute garbage collection and other relocation functions per internal relocation algorithms to refresh and/or relocate the data on memory device 110. Controller 108 may also execute foreground operations to process instructions transmitted from host 102. For example, controller 108 may read data from and/or write data to memory device 110 based on instructions received from host 102.

Storage device 104 may interface with host 102 through front-end link interface 114 according to one or more protocols. Storage device 104 may use front-end module 116 to process instructions and data received from host 102. Front-end module 116 may include or interface with L2P translation manager 112, i.e., a hardware engine for processing unmap host write commands. Storage device 104 may interface with memory 110 using back-end module 118. Back-end module 118 may include a flash translation layer and may maintain mapping tables for mapping physical addresses on memory device 110 to logical addresses provided by host 102 for data written to and/or read from memory device 110.

When host 102 sends a read/write command to storage device 104, host 102 may address logical pages in the command using logical block address(es). Storage device 104 may store data in the logical pages in RAM 120 and/or in blocks on memory device 110, wherein the logical block addresses sent from host 102 may be mapped one-to-one to physical addresses on RAM 120 and/or memory device 110. The one-to-one logical block address to physical address mappings may be stored in an L2P table.

When host 102 no longer needs a range of data including entries in the L2P table, host 102 may issue an unmap command to storage device 104. To process the unmap command, storage device 104 may fetch the unmap range(s) from host 102. Controller 108 may divide the unmap range(s) into unmap regions which may be a group of contiguous logical pages in the flash translation layer. The unmap regions may be tracked via a persistent unmap region bitmap or an appropriate data structure. An unmap range may be divided into, for example, 16 MB or 32 MB regions, each of which may be associated with a bit in the unmap region bitmap. Both the pending unmap region bitmap and the region descriptor memory data structure may persist across power cycles.

When controller 108 fetches the unmap range(s) from host 102, after setting corresponding bit(s) in the unmap region bitmap or an appropriate data structure, controller 108 may send a completion notification to host. Controller 108 may postpone processing other operations associated with the unmap command. For example, controller 108 may defer updating the L2P table with an unmap signature or entry, logging the L2P table updates, updating flash translation layer data structures, and clearing the corresponding bit(s) in the unmap region bitmap or appropriate data structure.

Based on the completion notification, host 102 may issue a subsequent write command that may overlap with an unmap region where deferred unmap operations are yet to be completed. To reduce latency associated with a host write command that overlaps with an unmap region, for each logical page in the host write command, controller 108 may determine if the host write command overlaps with a deferred unmap region. If it does, controller 108 may set a flag to indicate that the host write has collided with an unmap region, set a write collision bit when updating the L2P table, and process the host write command. If it does not, controller 108 may process the host write command. The L2P table entry update may occur under a serializer lock to prevent race condition of setting and/or clearing the write collision bit.

In processing the host write command, controller 108 may send a conditional update request to L2P translation manager 112 for each logical page in the command. If the logical page in the host write command is in an unmap region where the deferred unmap operations are yet to be completed, the conditional update request may include an opcode that may be set to an unmap collision value. If the logical page in the host write command is not in an unmap region where the deferred unmap operations are yet to be completed, the conditional update request may include an opcode that may be set to a conditional update value.

L2P translation manager 112 may check for conditional update requests. If the opcode associated with a conditional update request is set to the unmap collision value for a logical page, L2P translation manager 112 may set an associated collision bit in a skip-pending-unmap table and update the L2P table. For example, L2P translation manager 112 may set the collision bit to an on value to indicate that a host write overlaps with an unmap region where the deferred unmap operations are yet to be completed or to a cleared value to indicate no overlap between the host write command an unmap region where the deferred unmap operations are yet to be completed. L2P translation manager 112 may complete the conditional update request and send an indication to controller 108. The skip-pending-unmap table may be a bit size table associated with in the L2P table and the number of entries in the skip-pending-unmap table may be the same as the number of flash translation layer logical pages in storage drive 104.

Controller 108 may write/flush host data stored in RAM 120 to memory device 110. After flushing data in RAM 120 to memory device 110, controller 108 may perform a conditional update and preserve the states of the collision bits in the skip-pending-unmap table, wherein if a collision bit is in the on state, controller 108 may keep it in the on state, and if a collision bit is the cleared state, controller 108 may keep it in the cleared state. If the conditional update is successful, controller 108 may complete the write operation and garbage collect the data.

In some instances, background processing of deferred unmap operations may overlap with the flush process. There may thus be a case where a collision bit may be in the on state at the start of a flush/background operation and before controller 108 completes writing the data to memory device 110, deferred unmap operations may have been completed and the collision bit may have been set to a cleared state. In such a case, the conditional update operation may fail. In checking a failed conditional update, controller 108 may determine if a new L2P table update occurred because of a new write or a recycle write. Controller 108 may determine that a new L2P table update had occurred when the collision bit is still in the on state, and controller 108 may complete the write operation and garbage collect the data. If in checking the conditional update controller 108 determines that the collision bit is not set, controller 108 may determine that deferred unmap operations may have been performed and may perform a conditional update with the collision bit cleared. Controller 108 may complete the write operation and garbage collect the data.

When processing deferred unmap operations, controller 108 may select an unmap range and determine if the collision bits associated with that range are cleared. If the collision bits are clear, controller may update the L2P table with an unmap signature or entry for the entire range, log L2P updates, update the flash translation layer data structures, and clear the corresponding bit(s) in the unmap region bitmap or appropriate data structure. If a collision bit in that range is not cleared, controller 108 may process the deferred unmap operations such that the deferred unmap operations do not override host write commands.

In an implementation, if a collision bit in that range is not cleared, controller 108 may look up the L2P table for the range and loop through the L2P entries. In looping through the L2P entries, if a collision bit is set to an on value for a logical page in the L2P table, controller 108 may clear the collision bit and perform a conditional update, log L2P updates, and update the flash translation layer data structures. In looping through the L2P entries, if a collision bit is not set to an on value for a logical page in the L2P table, controller may update the L2P table with an unmap signature or entry, log L2P updates, and update the flash translation layer data structures.

Working with firmware on storage device 104, during deferred unmap operations, L2P translation manager 112 may determine if there are pending conditional update requests and if the unmap opcode is set to the unmap collision value. If it is, L2P translation manager 112 may determine if host writes have been processed in a logical page. If L2P translation manager 112 determines that host writes have been processed in a logical page, L2P translation manager 112 may clear the collision bit in the skip-pending-unmap table for the logical page and update the L2P table. When all page logical pages have been processed, L2P translation manager 112 may generate a skipped-L2P-updates bitmap to identify the logical pages for which deferred unmap operations were skipped. L2P translation manager 112 may complete the conditional update request to the firmware in storage device 104.

Controller 108 may also perform other background operations and may preserve the states of the collision bits during L2P update operations. In performing a background operation, controller 108 may read the L2P table and check if a collision bit is cleared. Controller 108 may relocate the data, perform a first conditional update to a new address on memory device 110, and preserve the state of the collision bit. If the first conditional update is successful, controller 108 may perform post processing. If the first conditional update fails and the collision bit is set, controller 108 may perform a second conditional update with the collision bit cleared, process the response, and perform post processing. If the second conditional update is successful, then an unmap may have occurred, and if the second conditional update is unsuccessful, then a new write may have occurred. If the first conditional update fails and the collision bit is not set, controller 108 may perform post processing.

To ensure that the values in L2P entries and the skip pending unmap table persist across power cycles, L2P translation manager 112 may return a 64-bit entry including the value from an L2P entry and associated the value from skip pending unmap table and store that 64-bit entry in a block in memory device 110. When power is restored, L2P translation manager 112 may read the 64-bit entry in memory device 110 and update and L2P table and the skip pending unmap table in RAM 120.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage components 110 or 120 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
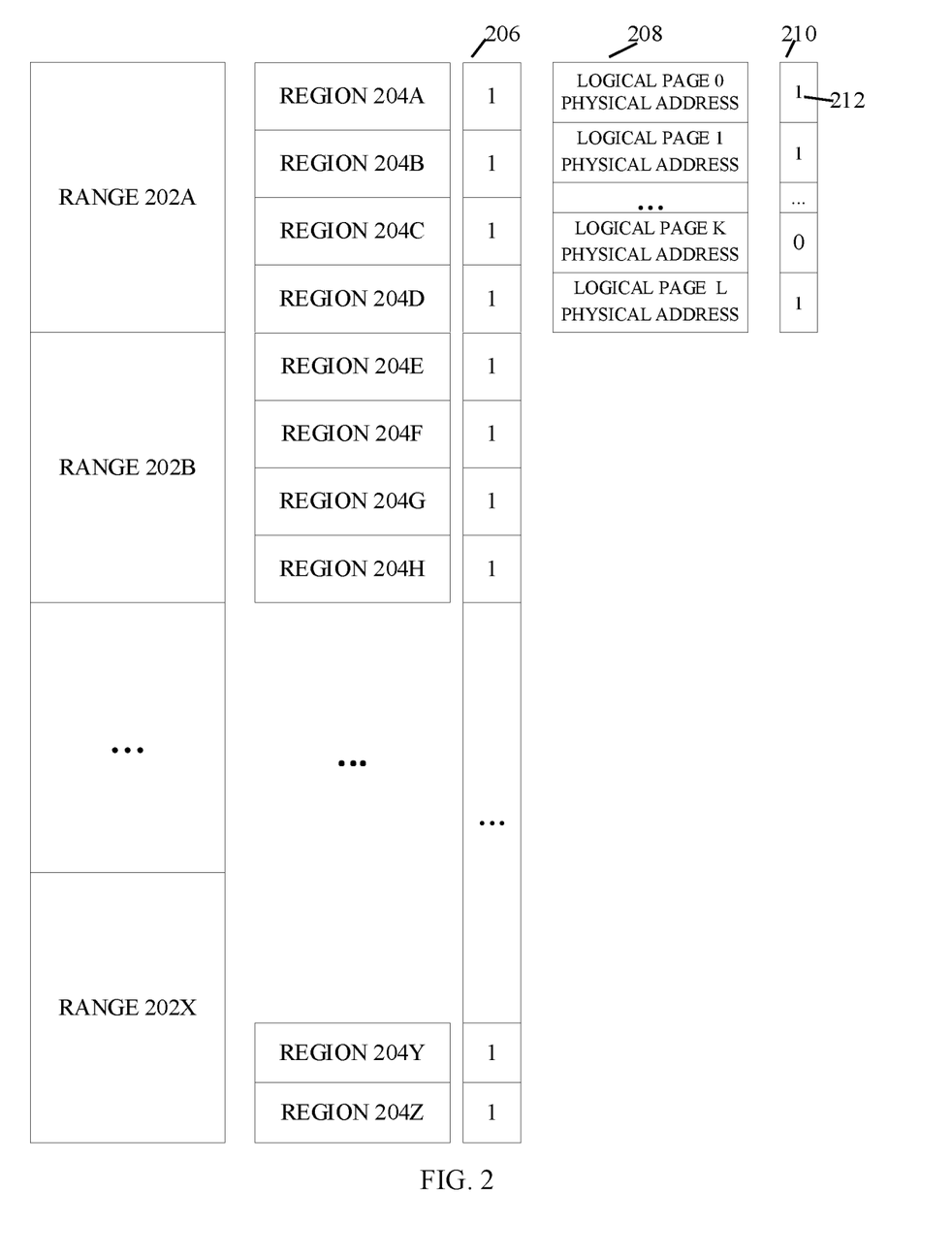
FIG. 2 is a block diagram including example unmap ranges and regions and associated tables in accordance with some embodiments.

FIG. 2 is a block diagram including example unmap regions and associated tables in accordance with some embodiments. To process an unmap command, storage device 104 may fetch the unmap range(s) 202a-202x from host 102. Unmap ranges 202 may be divided into unmap regions 204a-204z which may be a group of contiguous logical pages in the flash translation layer. Unmap regions 204a-204z may be tracked via a persistent unmap region bitmap 206. Unmap region bitmap 206 may be used to indicate a region for which a completion indication has been sent to host 102 in response to an unmap command from host 102 but which has deferred unmap operations that are yet to be completed. L2P table 208 may include logical pages in unmap regions 204a-204z. For the sake of simplicity, FIG. 2 shows the L2P entries for the logical pages in, for example, unmap region 204a only. L2P table 208 may also include logical pages in unmap regions 204b-204z. L2P table 208 may be associated with a skip-pending-unmap table 210 that may include a collision bit 212. Collision bit 212 may be set to an on/1 state when a logical page in a host write command is in an unmap region where deferred unmap operation have not been processed. Collision bit 212 may be set to a cleared/0 state when a logical page in a host write command is not an unmap region where deferred unmap operation have not been processed. As indicated above FIG. 2 is provided as an example. Other examples may differ from what is described in FIG. 2.

Figure 3A:
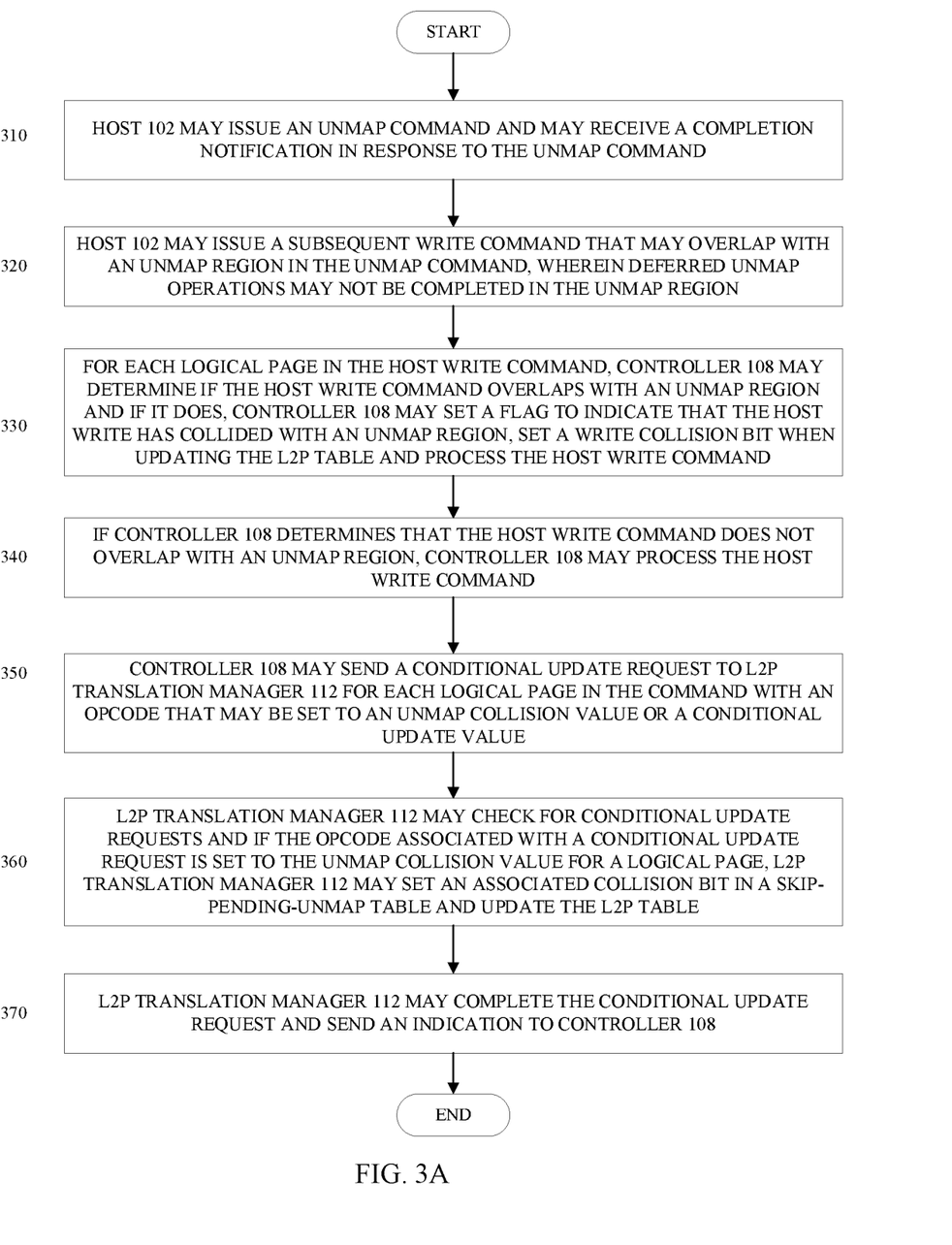
FIG. 3A is a flow diagram of an example process for processing host write commands when there is an unmap region where deferred unmap operations have not been processed in accordance with some implementations.

FIG. 3A is a flow diagram of an example process for processing host write commands when there is an unmap region where deferred unmap operations have not been processed in accordance with some implementations. At 310, host 102 may issue an unmap command and may receive a completion notification in response to the unmap command. At 320, host 102 may issue a subsequent write command that may overlap with an unmap region in the unmap command, wherein deferred unmap operations may not be completed in the unmap region. At 330, for each logical page in the host write command, controller 108 may determine if the host write command overlaps with an unmap region and if it does, controller 108 may set a flag to indicate that the host write has collided with an unmap region, set a write collision bit when updating the L2P table and process the host write command. At 340, if controller 108 determines that the host write command does not overlap with an unmap region, controller 108 may process the host write command.

At 350, controller 108 may send a conditional update request to L2P translation manager 112 for each logical page in the command with an opcode that may be set to an unmap collision value or a conditional update value. At 360, L2P translation manager 112 may check for conditional update requests and if the opcode associated with a conditional update request is set to the unmap collision value for a logical page, L2P translation manager 112 may set an associated collision bit in a skip-pending-unmap table and update the L2P table. At 370, L2P translation manager 112 may complete the conditional update request and send an indication to controller 108. As indicated above FIG. 3A is provided as an example. Other examples may differ from what is described in FIG. 3A.

Figure 3B:
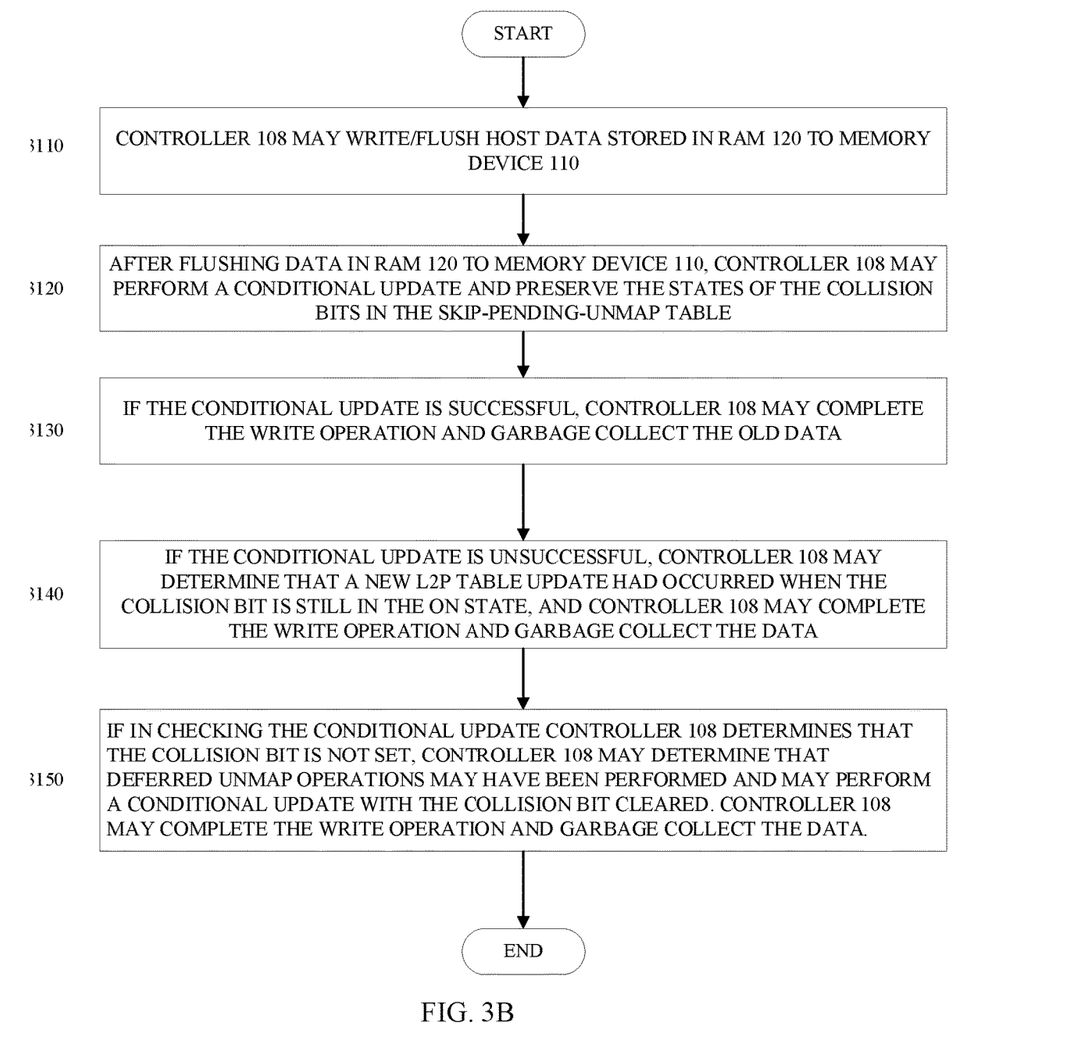
FIG. 3B is a flow diagram of an example process for flushing data in a RAM to a memory device when there is an unmap region where deferred unmap operations have not been processed in accordance with some implementations.

FIG. 3B is a flow diagram of an example process for flushing data in a RAM to a memory device when there is an unmap region where deferred unmap operations have not been processed in accordance with some implementations. At 3110, controller 108 may write/flush host data stored in RAM 120 to memory device 110. At 3120, after flushing data in RAM 120 to memory device 110, controller 108 may perform a conditional update and preserve the states of the collision bits in the skip-pending-unmap table. At 3130, if the conditional update is successful, controller 108 may complete the write operation and garbage collect the old data. At 3140, if the conditional update is unsuccessful, controller 108 may determine that a new L2P table update had occurred when the collision bit is still in the on state, and controller 108 may complete the write operation and garbage collect the data. At 3150, if in checking the conditional update controller 108 determines that the collision bit is not set, controller 108 may determine that deferred unmap operations may have been performed and may perform a conditional update with the collision bit cleared. Controller 108 may complete the write operation and garbage collect the data. As indicated above FIG. 3B is provided as an example. Other examples may differ from what is described in FIG. 3B.

Figure 3C:
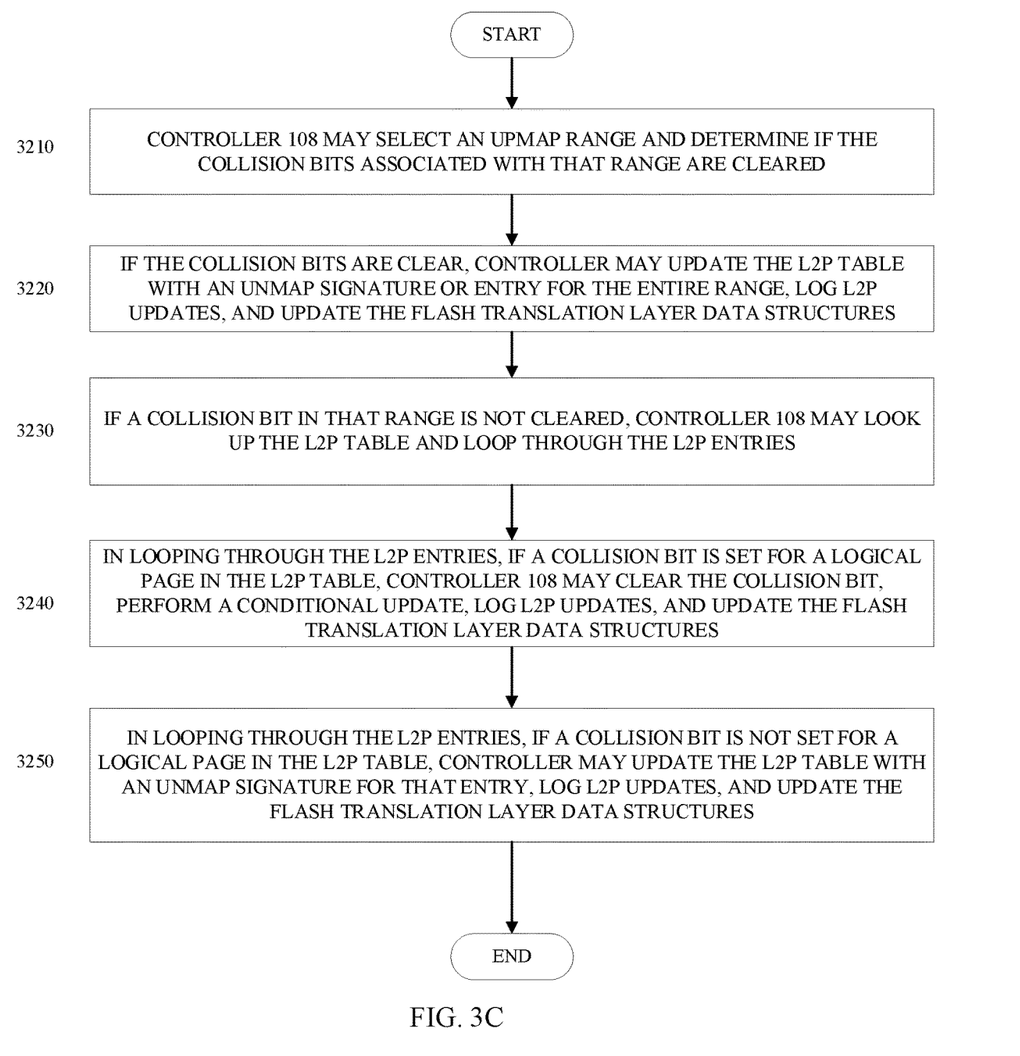
FIG. 3C is a flow diagram of an example process for processing deferred unmap operations when there may be a collision between a host write command and an unmap region where the deferred unmap operations have not been processed in accordance with some implementations.

FIG. 3C is a flow diagram of an example process for processing deferred unmap operations when there may be a collision between a host write command and an unmap region where the deferred unmap operations have not been processed in accordance with some implementations. At 3210, controller 108 may select an unmap range and determine if the collision bits associated with that range are cleared. At 3220, if the collision bits are clear, controller may update the L2P table with an unmap signature or entry for the entire range, log L2P updates, and update the flash translation layer data structures. At 3230, if a collision bit in that range is not cleared, controller 108 may look up the L2P table and loop through the L2P entries.

At 3240, in looping through the L2P entries, if a collision bit is set for a logical page in the L2P table, controller 108 may clear the collision bit, perform a conditional update, log L2P updates, and update the flash translation layer data structures. At 3350, in looping through the L2P entries, if a collision bit is not set for a logical page in the L2P table, controller may update the L2P table with an unmap signature for that entry, log L2P updates, and update the flash translation layer data structures. As indicated above FIG. 3C is provided as an example. Other examples may differ from what is described in FIG. 3C.

Figure 3D:
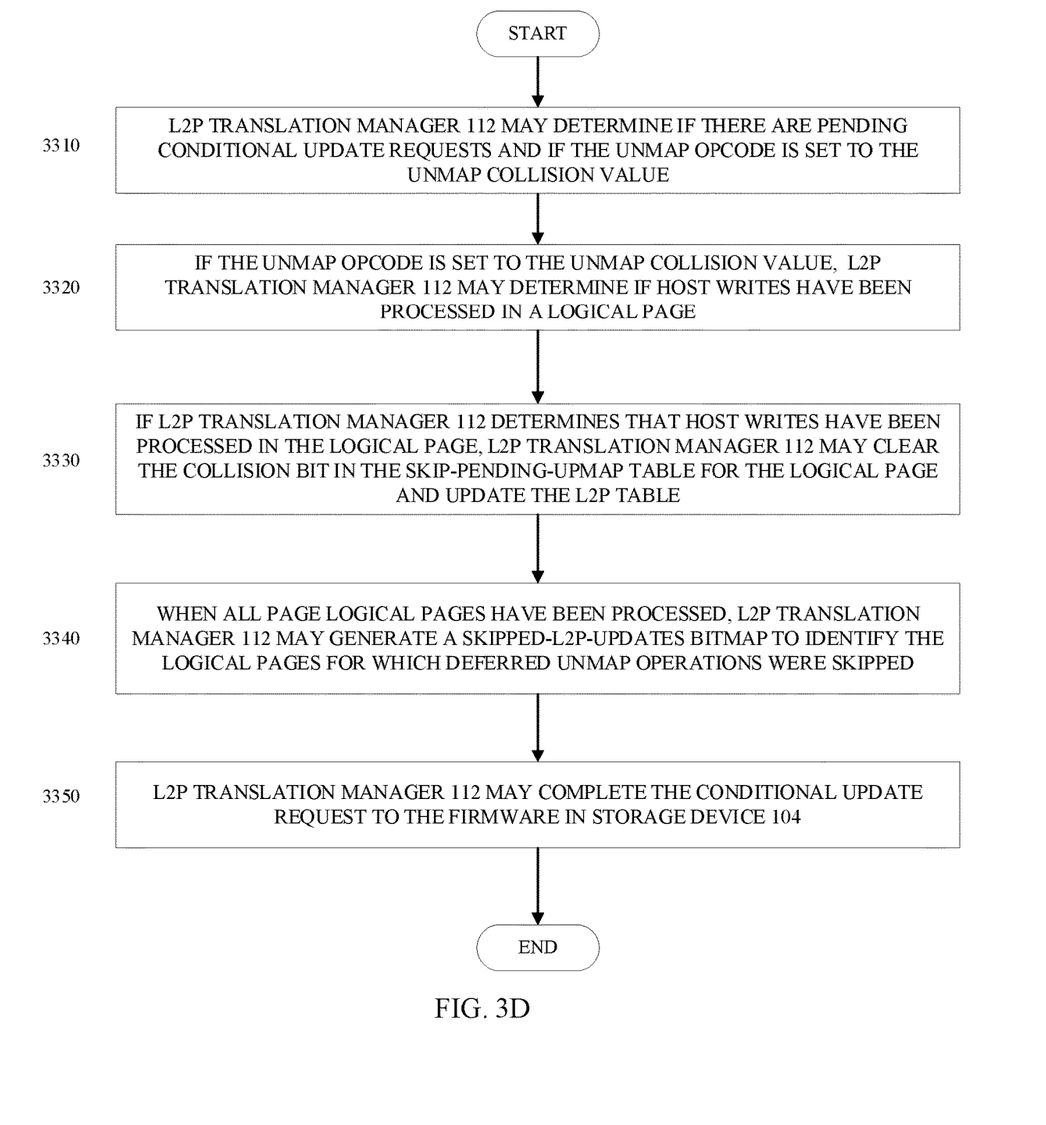
FIG. 3D is a flow diagram of an example process for processing deferred unmap operations in the L2P translation manager when there may be a collision between a host write command and an unmap region where the deferred unmap operations have not been processed in accordance with some implementations.

FIG. 3D is a flow diagram of an example process for processing deferred unmap operations in the L2P translation manager when there may be a collision between a host write command and an unmap region where the deferred unmap operations have not been processed in accordance with some implementations. At 3310, L2P translation manager 112 may determine if there are pending conditional update requests and if the unmap opcode is set to the unmap collision value. If the unmap opcode is set to the unmap collision value, at 3320, L2P translation manager 112 may determine if host writes have been processed in a logical page. At 3330, if L2P translation manager 112 determines that host writes have been processed in the logical page, L2P translation manager 112 may clear the collision bit in the skip-pending-unmap table for the logical page and update the L2P table. At 3340, when all page logical pages have been processed, L2P translation manager 112 may generate a skipped-L2P-updates bitmap to identify the logical pages for which deferred unmap operations were skipped. At 3350, L2P translation manager 112 may complete the conditional update request to the firmware in storage device 104. As indicated above FIG.

3D is provided as an example. Other examples may differ from what is described in FIG. 3D.

Figure 3E:
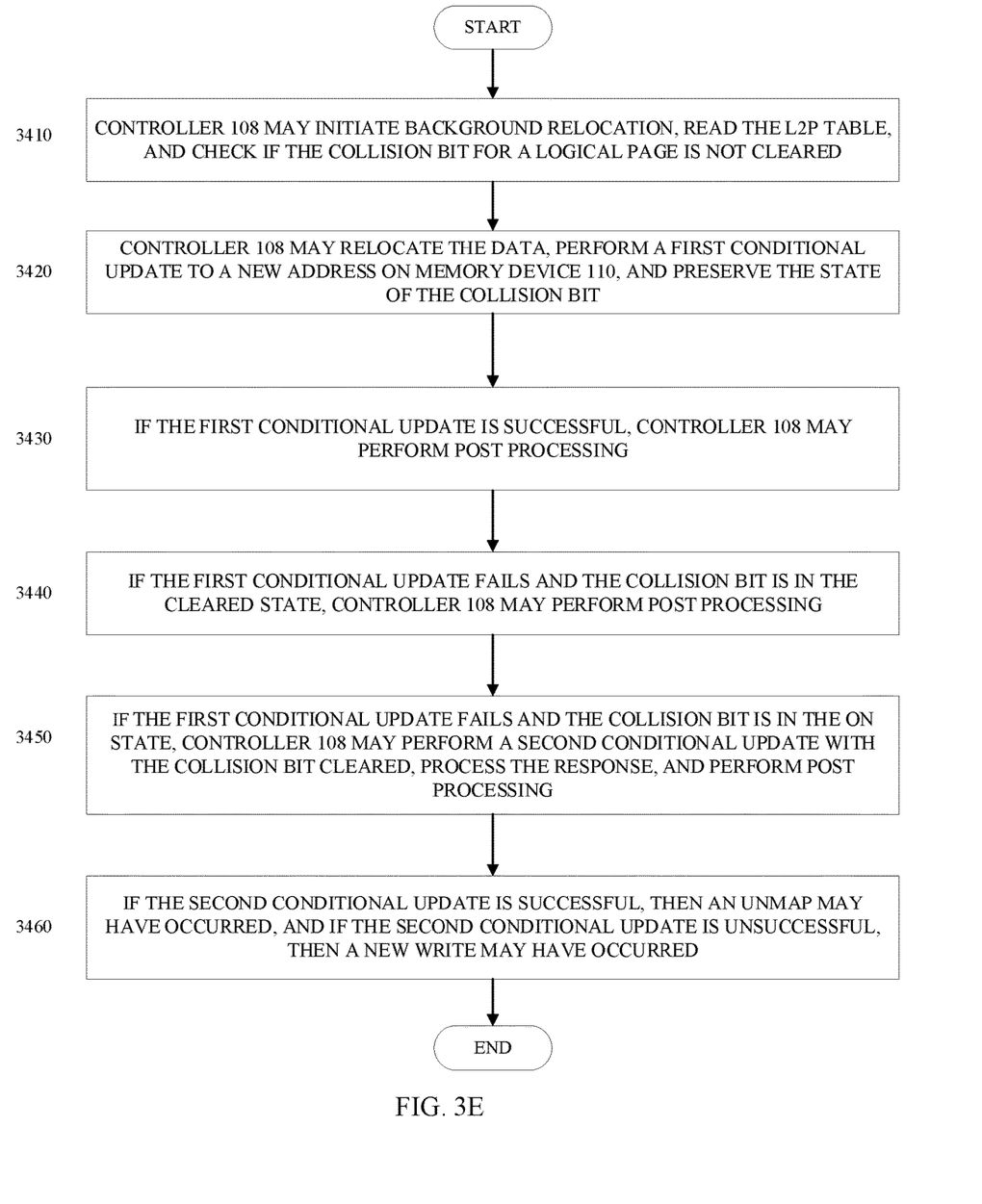
FIG. 3E is a flow diagram of an example process for performing background operation when there may be a collision between a host write command and an unmap region where the deferred unmap operations have not been processed in accordance with some implementations.

FIG. 3E is a flow diagram of an example process for performing a background operation when there may be a collision between a host write command and an unmap region where the deferred unmap operations have not been processed in accordance with some implementations. At 3410, controller 108 may initiate background relocation, read the L2P table, and check if the collision bit for a logical page is not cleared. At 3420, controller 108 may relocate the data, perform a first conditional update to a new address on memory device 110, and preserve the state of the collision bit. At 3430, if the first conditional update is successful, controller 108 may perform post processing.

At 3440, if the first conditional update fails and the collision bit is in the cleared state, controller 108 may perform post processing. At 3450, if the first conditional update fails and the collision bit is in the on state, controller 108 may perform a second conditional update with the collision bit cleared, process the response, and perform post processing. At 3460, if the second conditional update is successful, then an unmap may have occurred, and if the second conditional update is unsuccessful, then a new write may have occurred. As indicated above FIG. 3E is provided as an example. Other examples may differ from what is described in FIG. 3E.

Figure 4:
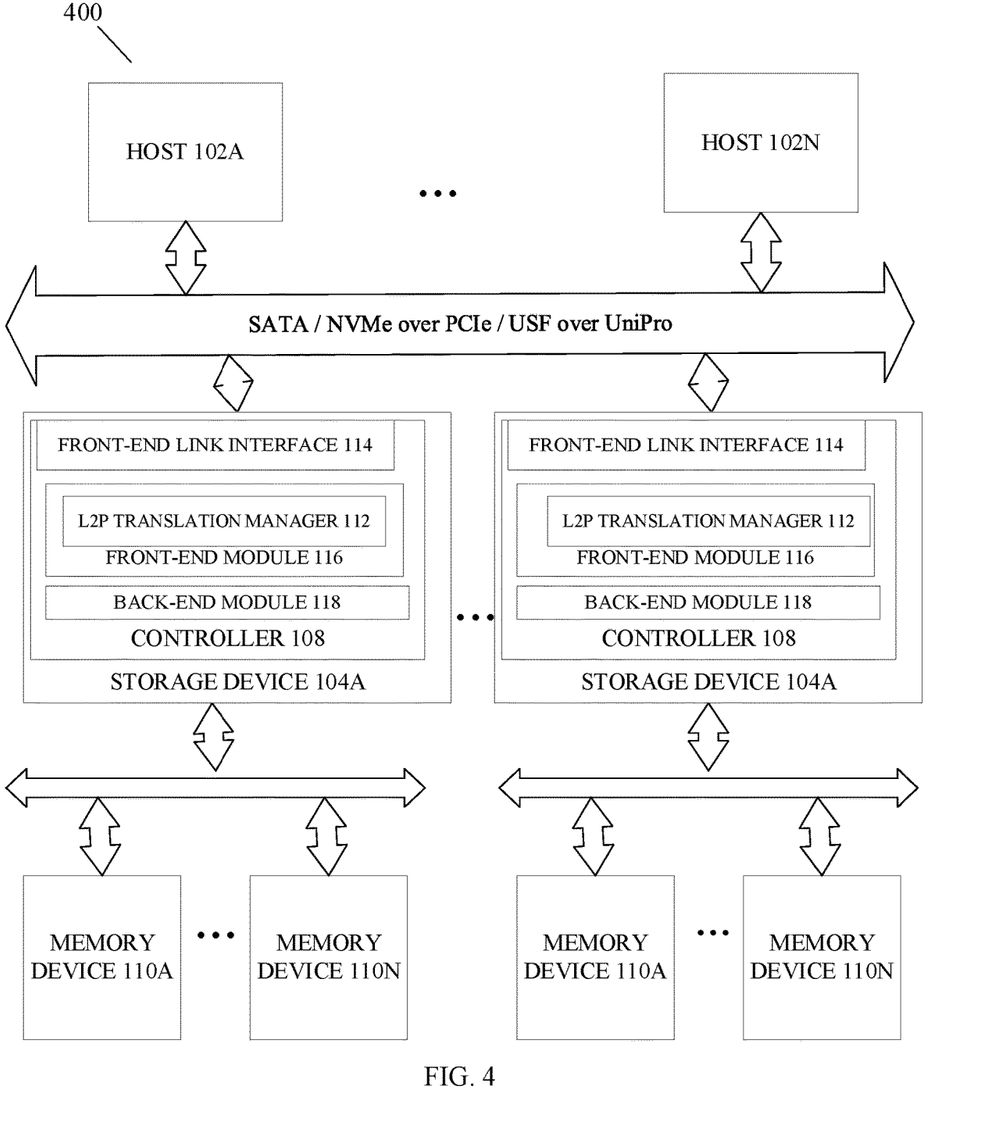
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102*n* (referred to herein as host(s) 102), and storage devices 104*a*-104*n* (referred to herein as storage device(s) 104).

Storage device 104 may include a controller 108 to manage the resources on storage device 104. Controller 108 may include an L2P translation manager 112 for processing unmap regions and host write command when there may be a collision between the host write command and an unmap region where the deferred unmap operations have not been processed. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
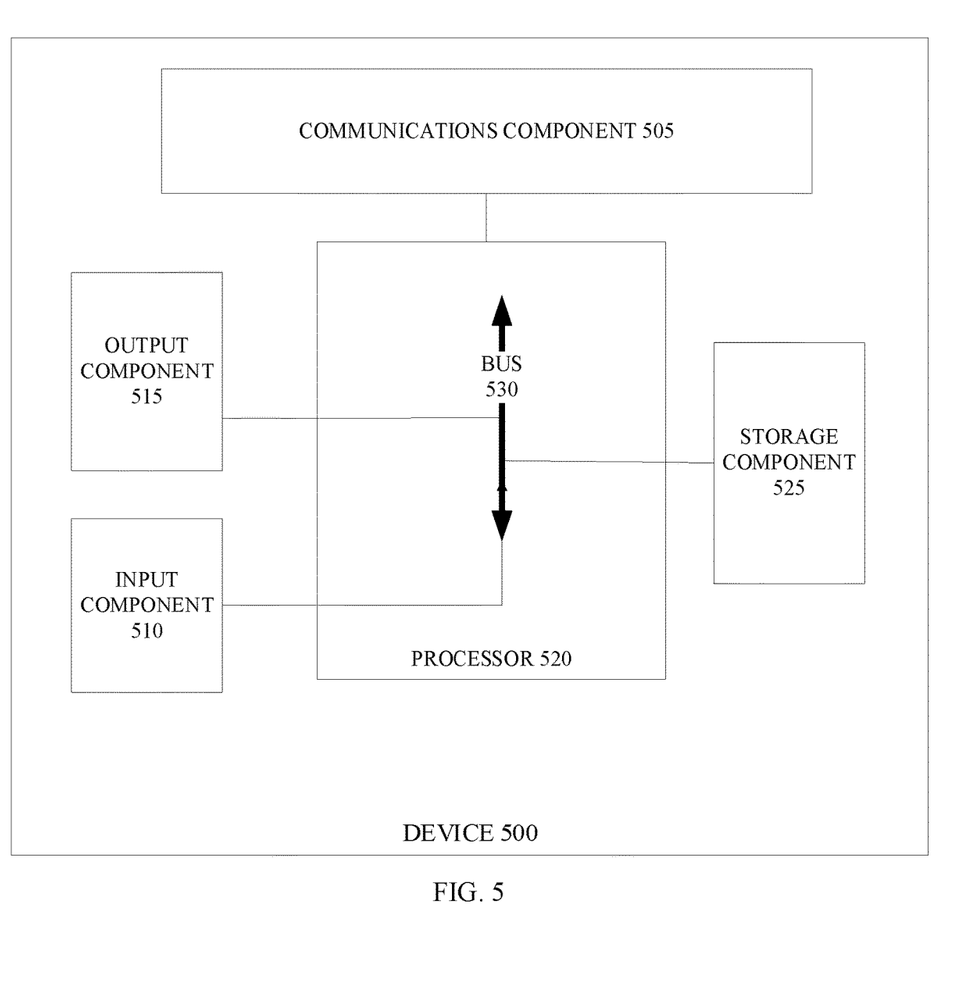
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to process a write command including a logical page in a range with deferred unmap operations that are yet to be completed and to process the deferred unmap operations while maintaining instructions from the write command, the storage device comprising:
    a controller to receive an unmap command and the write command from a host, determine that the logical page in the write command overlaps with a range in the unmap command with the deferred unmap operations, notate the overlap, and process the write command; and
    a logical to physical (L2P) translation manager to receive a conditional update request for the logical page in the write command from the controller, set a collision bit for the logical page in processing the write command, update a L2P table, and complete the conditional update request,
    wherein in processing the deferred unmap operations, the controller selects the range and i) if, based on collision bits in the range the controller determines that there is no overlap between the write command and the range, the controller performs the deferred unmap operations for the range, and ii) if, based on collision bits in the range the controller determines that there is an overlap between the write command and the range, the controller processes the deferred unmap operations to not override instructions in the write command.

2. The storage device of claim 1, wherein in notating the overlap the controller sets a flag and the collision bit when updating the L2P table.

3. The storage device of claim 1, wherein in processing the write command, the controller sets an opcode, in the conditional update request, to an unmap collision value when the logical page in the write command overlaps with the range.

4. The storage device of claim 3, wherein in processing the deferred unmap operations, based on the unmap collision value, the L2P translation manager based on determining that the write command has been processed in the logical page, clears the collision bit in a skip-pending-unmap table for the logical page, and updates the L2P table.

5. The storage device of claim 4, wherein when all logical pages in the range are processed, the L2P translation manager generates a skipped-L2P-updates bitmap to identify logical pages for which the deferred unmap operations were skipped.

6. The storage device of claim 1, wherein in processing the write command, the controller sends the conditional update request to the L2P translation manager.

7. The storage device of claim 1, wherein in processing the write command, the L2P translation manager sets the collision bit in a skip-pending-unmap table, the collision bit is set to one of an on value and a cleared value.

8. The storage device of claim 1, wherein when the controller flushes data in a buffer to a memory device, the controller preserves a state of the collision bit in a skip-pending-unmap table.

9. The storage device of claim 8, wherein in flushing the data, the controller performs the conditional update, and if the conditional update is unsuccessful, the controller, upon determining that a new L2P table update occurred because of one of a new write and a recycle write, completes a write operation.

10. The storage device of claim 8, wherein in flushing the data, the controller performs the conditional update, and if the conditional update is unsuccessful, the controller, upon determining that that deferred unmap operations have been performed, performs another conditional update with the collision bit cleared and completes a write operation.

11. The storage device of claim 1, wherein when the controller performs background operations the controller preserves a state of the collision bit during L2P update operations, wherein if the collision bit is in a cleared state, the controller relocates data and preserves the state of the collision bit.

12. A method for processing a host write command and deferred unmap operations in a storage device, the method comprising:
  receiving, by a controller, an unmap command and a write command from a host;
  based on determining, by the controller, that a logical page in the write command overlaps with a range in the unmap command with deferred unmap operations, setting a flag and a collision bit for the logical page, and processing the write command; and
  in processing the deferred unmap operations, selecting, by the controller, the range, and in response to determining that there is an overlap between the write command and the range based on the collision bits in the range, processing the deferred unmap operations to not override instructions in the write command.

13. The method of claim 12, further comprising in processing the write command, setting an opcode to an unmap collision value based on the logical page in the write command overlapping with the range, wherein in processing the deferred unmap operations, based on the opcode, determining that the write command has been processed in the logical page, and in response to determining that the write command has been processed, clearing the collision bit in a skip-pending-unmap table for the logical page, and updating a L2P table.

14. The method of claim 13, wherein in response to all logical pages in the range being processed, generating a skipped-L2P-updates bitmap to identify logical pages for which the deferred unmap operations were skipped.

15. The method of claim 12, wherein in processing the write command, the
  method further comprises sending a conditional update request to an L2P translation manager wherein the L2P translation manager sets the collision bit in a skip-pending-unmap table, the collision bit is set to one of an on value or a cleared value.

16. The method of claim 12, further comprising preserving a state of the collision bit in a skip-pending-unmap table in response to flushing data in a buffer to a memory device.

17. A method for processing deferred unmap operations in a storage device, the method comprising:
  selecting, by a controller, a range including the deferred unmap operations, and
  checking, by the controller, collision bits in the range, and in response to determining that there is an overlap between a write command and the range based on the collision bits, processing the deferred unmap operations to not override instructions in the write command.

18. The method of claim 17, wherein in response to determining that there is the overlap, the processing the deferred unmap operations comprises:
  determining that a collision bit in the range is in an on state;
  looking up an L2P table for the range and looping through L2P entries in the L2P table;
  in response to determining that the collision bit is set to the on state for a logical page in the L2P table, clearing the collision bit, performing a conditional update, and processing the deferred unmap operations.

19. The method of claim 18, wherein based on a unmap collision value associated with the logical page, the method further comprises determining, by a L2P translation manager, that a host write command has been processed, in response to determining that the host write command has been processed, clearing the collision bit in a skip-pending-unmap table for the logical page, and updating the L2P table.

20. The method of claim 19, wherein in response to all logical pages in the range being processed, the method further comprises generating, by the L2P translation manager a skipped-L2P-updates bitmap to identify logical pages for which the deferred unmap operations were skipped.

* * * * *